United States Patent
Ozark

[11] Patent Number: 5,839,738
[45] Date of Patent: Nov. 24, 1998

[54] WHEELED COOLER MODULE WITH STORAGE FOR VEHICLE

[75] Inventor: L. John Ozark, Gross Pointe Woods, Mich.

[73] Assignee: Chrysler Corporation, Auburn Hills, Mich.

[21] Appl. No.: 582,249

[22] Filed: Jan. 3, 1996

[51] Int. Cl.⁶ ................................ B62B 1/10; B62B 1/14
[52] U.S. Cl. ..................... 280/30; 280/655.1; 280/47.26
[58] Field of Search ................ 280/30, 35, 655, 280/655.1, 47.17, 47.19, 47.26, 47.315; 62/457.1, 547.7, 457.9, 457.3, 337; 16/110.5, 115; 220/902

[56] References Cited

U.S. PATENT DOCUMENTS

| | | | |
|---|---|---|---|
| 1,042,249 | 10/1912 | Mickelson | 62/457.7 |
| 3,069,869 | 12/1962 | Mueller | 62/457.9 |
| 3,354,668 | 11/1967 | Cserny | 62/457.9 |
| 3,572,054 | 3/1971 | Curcio | 62/457.1 |
| 4,515,421 | 5/1985 | Steffes | 62/457.7 |
| 4,577,475 | 3/1986 | Herrera | 62/457.1 |
| 4,632,242 | 12/1986 | Choi et al. | 16/115 |
| 4,726,193 | 2/1988 | Burke et al. | 62/457.7 |
| 4,759,190 | 7/1988 | Trachtenberg et al. | 62/457.9 |
| 4,981,019 | 1/1991 | Hicks et al. | 62/457.1 |
| 5,048,649 | 9/1991 | Carpenter et al. | 280/37 |
| 5,228,706 | 7/1993 | Boville | 280/30 |
| 5,373,708 | 12/1994 | Dumoulin, Jr. | 280/30 |
| 5,419,602 | 5/1995 | VanHoose | 296/39.1 |
| 5,469,999 | 11/1995 | Phirippidis | 280/35 |
| 5,492,356 | 2/1996 | Callum | 296/64 |
| 5,683,097 | 11/1997 | Fenton et al. | 280/47.26 |

Primary Examiner—Brian L. Johnson
Assistant Examiner—Bridget Avery

[57] ABSTRACT

A wheeled cooler module includes a hollow container defining opposed front and rear ends. Wheels are rotationally engaged with the front end of the container, and a telescoping handle is attached to the rear end of the container. The wheeled module can be wheeled up to a van, loaded front end first into a bay located in the rear of the passenger compartment of the van, and conveniently transported.

11 Claims, 1 Drawing Sheet

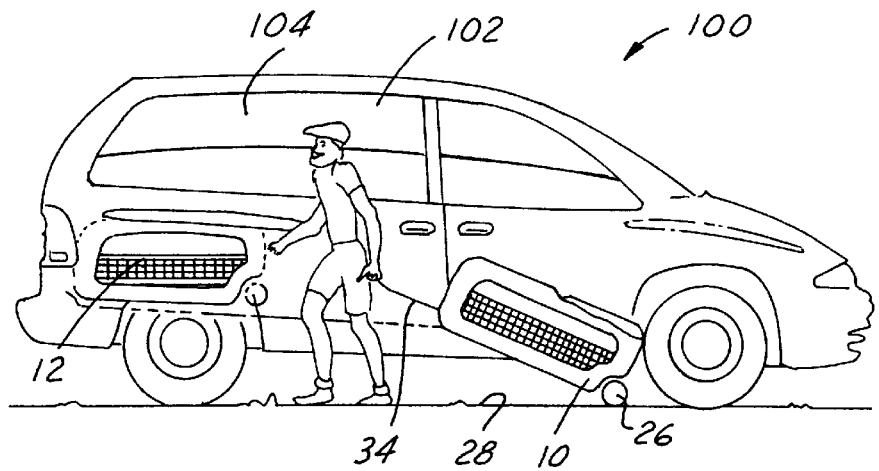
FIG. 1
FIG. 2
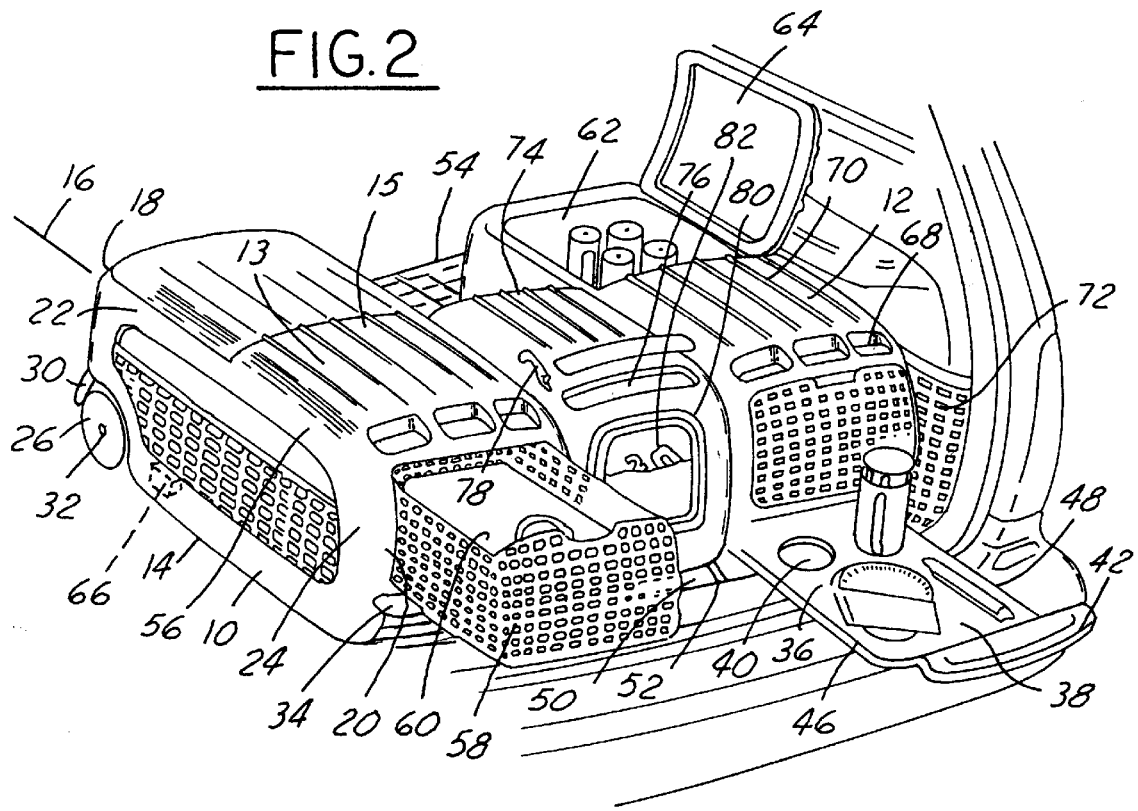

WHEELED COOLER MODULE WITH STORAGE FOR VEHICLE

FIELD OF INVENTION

The present invention relates generally to vehicles, and more particularly to modular cooler systems for vehicles.

BACKGROUND OF THE INVENTION

Recreational vehicles such as passenger vans are becoming increasingly popular. One reason for their popularity is that vehicles such as vans afford consumers increased interior space for passengers and for equipment. For example, sports equipment such as snow skis can be comfortably stowed and transported in passenger vans, whereas it is difficult if not impossible to stow skis inside passenger automobiles.

Additionally, large containers, e.g., coolers for holding beverage cans and bottles, can be stowed in the passenger compartment of vans, thereby affording passengers convenient access to the containers without stopping the van and exiting the passenger compartment. In contrast, it is difficult and cumbersome to stow large containers in the passenger compartments of many automobiles. Consequently, large containers that are to be transported by automobile are typically stowed in the trunk of the automobile, thereby undesirably preventing access to the containers from inside the passenger compartment.

While it is relatively easier to stow large, cumbersome containers in vans as compared to automobiles, however, such containers are typically not secured. This increases the likelihood of container shifting during travel, which in turn can lead to damage and personal injury, particularly in the case of heavy beverage containers. Furthermore, upon reaching their intended destination, passengers must either unload large, heavy containers from the van and then carry the containers to a site that might not be located immediately adjacent the van, or unload the containers' contents individually as needed. This can be cumbersome. As recognized by the present invention, however, it is possible to provide a modular beverage container for vans which conveniently can be loaded into the van, stowed, unloaded, and moved away from the van.

Accordingly, it is an object of the present invention to provide a modular cooler-container for a recreational vehicle which can store smaller beverage containers and food items. Another object of the present invention is to provide a modular cooler-container for a van which cools the contents of the cooler during storage. Still another object of the present invention is to provide a cooler-container for a van that is easy to use and cost-effective to manufacture.

SUMMARY OF THE INVENTION

A wheeled cooler module is disclosed for a passenger van having a passenger compartment defining a rear cargo space. The modules includes a generally parallelepiped-shaped hollow body which is formed with an open end and which defines a bin chamber extending into the body from the open end. A storage bin is slidably engaged with the body for reciprocating movement within the bin chamber. The storage bin can be moved between a housed position, wherein the storage bin is substantially within the body, and an access position, wherein the storage bin extends outwardly from the body such that items within the bin are exposed. At least one rolling element is rotatably engaged with the body for facilitating rollable transport of the body.

In a presently preferred embodiment, the body defines a front portion and a rear portion, and the rolling element is rotatably engaged with front portion. Also, the open end is formed in the rear portion of the body. Preferably, a tray handle is slidably engaged with the body for reciprocating movement between a housed position, wherein the tray handle does not extend beyond the body, and an extended position, wherein the tray handle extends beyond the rear portion of the body such that the tray handle can be grasped to tilt the body for rolling the body on the wheels.

Additionally, the preferred embodiment contemplates that the front portion of the body defines a refrigerator cavity for holding items to be cooled therein. As intended by this embodiment, an electrically-powered refrigeration system is disposed in the body in thermal contact with the refrigerator cavity for cooling the cavity.

In accordance with the present invention, the tray handle defines a top surface formed with at least one depression for receiving an object therein. Moreover, the rear portion of the body defines a top surface formed with at least one depression for receiving an object therein. The module can be part of a combination which includes the van, another like module, and a water tank positioned between the modules in the rear cargo space for holding water therein. A pressurizer can be disposed in fluid communication with the tank for pressurizing fluid within the tank.

In another aspect of the present invention, a passenger van includes a rear cargo space and a wheeled cooler module configured for loading and unloading the module in the rear cargo space. A novel embodiment of the module is disclosed below.

In still another aspect, a generally parallelepiped-shaped cooler module is disclosed which defines a bottom surface. The bottom surface establishes a long dimension. The cooler module also includes front and rear ends that are perpendicular to the long dimension and which bound the bottom surface.

Per the present invention, the cooler module includes at least one rolling element engaged with the bottom surface near the front end for supporting the module in rollable engagement with a support surface. Moreover, the cooler module includes a rigid tray handle reciprocatingly engaged with the module at the rear end thereof for movement between a housed position, wherein the tray handle does not extend beyond the rear end, and an extended position, wherein the tray handle extends beyond the rear end such that the tray handle can be grasped to tilt the body for rolling the body on the rolling element.

Accordingly, with its conformation and combination of transport structure, stowage of the cooler module in the elongated passenger compartment of a van is facilitated. More specifically, the cooler module can be loaded front end first through the rear door of a van and be pushed into the passenger compartment on its wheel, with the long dimension of the cooler being parallel to the long dimension of the van. The tray handle is conveniently accessible through the rear door of the van for manipulation of the handle to stow items on the tray handle, to push the module into the van, and to pull the module out of the van through the rear door.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a side view of a passenger van incorporating the modular wheeled cooler module of the present invention, with portions shown in phantom; and FIG. 2 is a perspective view of the rear cargo space of the passenger van, showing two modular coolers and a water tank, with portions broken away and other portions shown in phantom.

DETAILED DESCRIPTION OF THE PREFERRED EMBODIMENT

With particular regard to both Figures, a passenger van, generally designated 100, includes a passenger compartment 102 defining a rear cargo space 104. As can be appreciated in cross-reference to the Figures, at least one and preferably first and second generally parallelepiped-shaped, hollow cooler modules 10, 12 can be removably disposed side by side in the rear cargo space 104. In other words, what is meant by "removably disposed" is that the modules 10, 12 can easily be manually loaded into the cargo space 104 and easily manually removed therefrom, owing to the portable, modular construction of the modules 10, 12.

In accordance with the present invention, the modules 10, 12 can be identical to each other. Accordingly, for ease of disclosure certain inventive features will be described in relation to the first module 10 and certain other features will be described in relation to the second module 12, with the understanding that a single module of the present invention can incorporate all of the disclosed features.

As shown best in FIG. 2, the first module 10 includes a body 13 that is formed from thermally insulative cooler material. The body 13 defines opposed parallel bottom and top surfaces 14, 15 which establish a long dimension, denoted by the reference numeral 16. Moreover, the first module 10 includes front and rear ends 18, 20 which are perpendicular to the long dimension 16 and which bound the bottom and top surfaces 14, 15. As intended herein, the module 10 consequently defines a front portion 22 which terminates in the front end 18, and a rear portion 24 which terminates in the rear end 20.

The Figures show that at least one rolling element 26 is engaged with the bottom surface 14 for supporting the first module 10 in rollable engagement with a support surface, such as the ground 28. Per the present invention, the rolling element 26 can be established by one or more rigid metal or hard plastic wheels or rollers which are rotatably engaged with the module 10 by means well-known in the art, e.g., by means of a keeper 30 and/or an axle 32 which is coupled to the module 10.

The first module 10 includes a first rigid flat plastic tray handle 34 which is reciprocatingly engaged with the module 10. Likewise, the second module 12 includes a second rigid flat plastic tray handle 36. Each tray handle 34, 36 can be manually moved between a housed position (as shown for the first handle 34), wherein the tray handle 34, 36 does not extend beyond the rear end of the respective module 10, 12, and an extended position (as shown for the second handle 36), wherein the tray handle 34, 36 extends beyond the rear end such that the tray handle can be grasped to tilt the module 10, 12 for rolling the module 10, 12 on the rolling element.

Taking the second handle 36 as an example, the second handle 36 defines a continuous flat tray surface 38 for supporting food items thereon. To facilitate holding objects such as food items onto the tray surface 38, a plurality of depressions 40 are formed in the tray surface 38. Moreover, the handle 365 terminates in a grip 42 that can easily be grasped by a person, as shown in FIG. 1.

The second handle 36 defines side edges 46, 48, each of which is slidably engaged with a respective groove that is formed in the body 15 (only one groove 50 shown). Furthermore, each side edge 46, 48 is retained in its associated groove by means well-known in the art. For example, the side edge 48 can be formed with an enlarged keeper element 52 that is trapped in the groove 50.

With this combination of structure, the tray handles 34, 36 can be moved to the housed position for stowage. Also, the tray handles 34, 36 can be moved to the extended position for supporting objects such as food items thereon, as shown with regard to the second module 12 in Figure. Additionally, in the extended position each tray handle 34, 36 can be used as a handle, as shown in FIG. 1, for tilting the module 10 as shown and rollably transporting the module 10.

As shown in FIG. 2, the body 13 is formed with an open end 54 that is coplanar with the rear end 20 of the module 10. As further shown, the body 13 defines a bin chamber 56 which extends into the body 12 from the open end 54, above and parallel to the associated handle tray 34.

A hollow plastic storage bin 58 is slidably engaged with the body 13 for reciprocating movement within the bin chamber 56. The storage bin 58 is preferably made of vinyl coated wire. As can be appreciated in reference to FIG. 2, the bin 58 can be moved between a housed position, wherein the bin 58 is substantially within the body 13, and an access position, wherein the bin 58 extends outwardly from the body 13 such that items within the bin 58 are exposed through an open top 60 of the bin 58.

Still referring to FIG. 2, as shown best in reference to the second module 12, the front portion of the module 12 defines a refrigerator cavity 62 for holding items to be cooled therein. The refrigerator cavity 62 can be selectively covered by a lid 64 that is hingedly attached to the module 12. As shown in phantom in reference to the first module 10, an electrically-powered refrigeration system 66 is preferably disposed in the module 10 in thermal contact with the associated refrigerator cavity for cooling the cavity by means well-known in the art. The refrigeration system 66 can be any appropriate system which can be electrically connected to an AC or, more preferably, a DC power source, such as the battery of the van 100.

In addition to disposing objects such as food items, loose change, etc. on the tray handle 36, such objects can be disposed in depressions 68 that are formed in a top surface 70 of the module 12. To support the modules 10, 12 without damaging the modules 10, 12 or van 100, a resilient cargo liner 72 is preferably fixedly disposed in the rear cargo space 104.

FIG. 2 shows that a hollow plastic water tank 74 can be positioned between the modules 10, 12 for holding water or other fluid therein. If desired, a pressurizer, such as a pump handle 76, is engaged with the tank 74 in fluid communication with the contents of the tank 74 for pressurizing fluid within the tank 74. Fluid communication with the contents of the tank 74 can be established through a hose 78 or an open front end 80 that is selectively covered by a hinged lid 82.

While the particular WHEELED COOLER MODULE WITH STORAGE FOR VEHICLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A wheeled cooler module for a passenger van having a passenger compartment defining a rear cargo space, a wheeled cooler module, comprising:

a generally parallelepiped-shaped hollow body defining a front portion and a rear portion, the hollow body formed with an open end formed in the rear portion of the body and defining a bin chamber extending into the body from the open end;

a non-refrigerated storage bin slidably engaged with the body for reciprocating movement within the storage bin chamber between a housed position, wherein the storage bin is substantially within the body, and an access position, wherein the storage bin extends outwardly from the body such that items within the bin are exposed;

at least one rolling element rotatably engaged with the front portion of the body for facilitating rollable transport of the body;

a refrigerated cavity for holding items to be cooled therein;

a rigid flat tray handle slidably engaged with the body for reciprocating movement between a housed position, wherein the tray handle does not extend beyond the body, and an extended position, wherein the tray handle extends beyond the rear portion of the body such that the tray handle can be grasped to tilt the body for rolling the body on the wheels, wherein the tray handle defines a top surface formed with at least one depression for receiving an object therein, and the rear portion of the body defines a top surface formed with at least one depression for receiving an object therein; and an electrically-powered refrigeration system disposed in the body in thermal contact with the refrigerator cavity for cooling the cavity.

2. The wheeled cooler module of claim 1 in combination with the van, the van further comprising a resilient cargo liner disposed in the rear cargo space for supporting the module thereon.

3. The combination of claim 2, wherein the module is a first module and the combination further comprises a second module, the modules being configured for side-by-side stowage of the modules in the rear cargo space.

4. The combination of claim 3, further comprising:

a water tank positionable between the modules in the rear cargo space for holding water therein; and a pressurizer in fluid communication with the tank for pressurizing fluid within the tank.

5. A passenger van, comprising:

a rear cargo space;

a wheeled cooler module configured for loading and unloading the module in the rear cargo space, the module including a generally parallelepiped-shaped hollow body defining a front portion and a rear portion formed with an open end formed in the rear portion of the body and defining a bin chamber extending into the body from the open end, a non-refrigerated storage bin slidably engaged with the body for reciprocating movement within the bin chamber between a housed position, wherein the storage bin is substantially within the body, and an access position, wherein the storage bin extends outwardly from the body such that items within the bin are exposed, two opposed wheels rotatably engaged with the front portion of the body for facilitating rollable transport of the body, and a refrigerator cavity for holding items to be cooled therein, a rigid flat tray handle slidably engaged with the body for reciprocating movement between a housed position, wherein the tray handle does not extend beyond the body, and an extended position, wherein the tray handle extends beyond the rear portion of the body such that the tray handle can be grasped to tilt the body for rolling the body on the wheels wherein the tray handle defines a top surface formed with at least one depression for receiving an object therein, and the rear portion of the body defines a top surface formed with at least one depression for receiving an object therein; and an electrically-powered refrigeration system disposed in the body in thermal contact with the refrigerator cavity for cooling the cavity.

6. The passenger van of claim 5, further comprising a resilient cargo liner disposed in the rear cargo space for supporting the module thereon.

7. The passenger van of claim 5, wherein the module is a first module and the van further comprises a second module, the modules being configured for side-by-side stowage of the modules in the rear cargo space.

8. The passenger van of claim 7, further comprising:

a water tank positionable between the modules in the rear cargo space for holding water therein; and a pressurizer in fluid communication with the tank for pressurizing fluid within the tank.

9. A generally parallelepiped-shaped cooler module defining a bottom surface establishing a long dimension and front and rear ends perpendicular to the long dimension and bounding the bottom surface, comprising:

at least one rolling element engaged with the bottom surface for supporting the module in rollable engagement with a support surface;

a rigid tray handle reciprocatingly engaged with the module substantially along the long dimension of the module for movement between a housed position, wherein the tray handle does not extend beyond the rear end, and an extended position, wherein the tray handle extends beyond the rear end such that the tray handle can be grasped to tilt the body for rolling the body on the rolling element, and wherein the tray handle defines a top surface formed with at least one depression for receiving an object therein, and the rear portion of the body defines a top surface formed with at least one depression for receiving an object therein;

a generally parallelepiped-shaped hollow body defining a front portion and a rear portion formed with an open end formed in the rear portion of the body and coplanar with the rear end of the module, the body defining a bin chamber extending into the body from the open end;

a non-refrigerated storage bin slidably engaged with the body for reciprocating movement within the bin chamber between a housed position, wherein the storage bin is substantially within the body, and an access position, wherein the storage bin extends outwardly from the body such that items within the bin are exposed; and a refrigerated cavity for holding items to be cooled therein; and an electrically-powered refrigeration system disposed in the body in thermal contact with the refrigerator cavity for cooling the cavity.

10. The cooler module of claim 9, wherein the body defines a front portion and a rear portion, and two opposed wheels are rotatably engaged with front portion, the open end being formed in the rear portion of the body.

11. The cooler module of claim 9, in combination with a passenger van comprising a rear cargo space and a resilient cargo liner disposed in the rear cargo space for supporting the module thereon, wherein the module is a first module and the combination further comprises:

a second module, the modules being configured for side-by-side stowage of the modules in the rear cargo space;

a water tank positionable between the modules in the rear cargo space for holding water therein; and a pressurizer in fluid communication with the tank for pressurizing fluid within the tank.

* * * * *